United States Patent
Diamant et al.

(10) Patent No.: US 10,579,591 B1
(45) Date of Patent: Mar. 3, 2020

(54) INCREMENTAL BLOCK COMPRESSION

(71) Applicant: Amazon Technologies, Inc., Seattle, WA (US)

(72) Inventors: Ron Diamant, Albany, CA (US); Andrea Olgiati, Gilroy, CA (US); Nathan Binkert, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 311 days.

(21) Appl. No.: 15/385,740

(22) Filed: Dec. 20, 2016

(51) Int. Cl.
*G06F 17/00* (2019.01)
*G06F 16/17* (2019.01)

(52) U.S. Cl.
CPC ................ *G06F 16/1727* (2019.01)

(58) Field of Classification Search
None
See application file for complete search history.

(56) References Cited

U.S. PATENT DOCUMENTS

| | | | | |
|---|---|---|---|---|
| 5,408,542 | A * | 4/1995 | Callahan | G06F 12/0875 358/1.9 |
| 5,991,454 | A * | 11/1999 | Fowler | G01S 1/04 382/239 |
| 6,553,141 | B1 * | 4/2003 | Huffman | H04N 21/6377 375/E7.016 |
| 8,615,500 | B1 * | 12/2013 | Armangau | G06F 16/1752 707/693 |
| 2002/0097917 | A1 * | 7/2002 | Nelson | G06T 9/00 382/239 |
| 2013/0297575 | A1 * | 11/2013 | Fallon | G06F 16/22 707/693 |
| 2016/0306561 | A1 * | 10/2016 | Huang | G06F 3/0608 |

* cited by examiner

*Primary Examiner* — Hung D Le
(74) *Attorney, Agent, or Firm* — Davis Wright Tremaine LLP

(57) ABSTRACT

Techniques for performing incremental block compression using a processor are described herein. The processor receives a request to compress input data, the request including compression parameters for the compression and a target block size. The processor divides the input data into portions. The processor iteratively compresses the input data to an output block, until compressing another portion of data would increase a file size of the output block over a threshold value that is based at least on the target block size.

20 Claims, 12 Drawing Sheets

INCREMENTAL BLOCK COMPRESSION

BACKGROUND

The demand for storage capacity is growing rapidly. As a result, disk storage is at a premium and can be a significant cost to those who need to store a large amount of data. One approach to reducing data storage costs is through data compression. Data compression can be used to store more information per unit of storage (e.g., per megabyte), thus reducing the need for additional storage devices. Various techniques for improving the effective capacity of storage have gained attention. Data compression may be employed in order to reduce the storage space needed to store certain data, and may also be used to reduce data transfer costs.

One useful type of data compression is block compression, where subsets of a data block are compressed separately and individually. Block compression, however, is generally computationally expensive in terms of central processing unit cycles involved in doing the compression and can cause the compressed data to be inefficiently stored. One technique that may be used to alleviate these two problems is to use incremental compression, where the data is incrementally compressed based on the block size so as to improve the storage inefficiencies. Compute resources spent on compression may lead to workload problems on the processor, potentially decreasing performance of the compression and/or slowing down the system as a whole.

BRIEF DESCRIPTION OF THE DRAWINGS

Various techniques will be described with reference to the drawings, in which.

DETAILED DESCRIPTION

Figure 1:
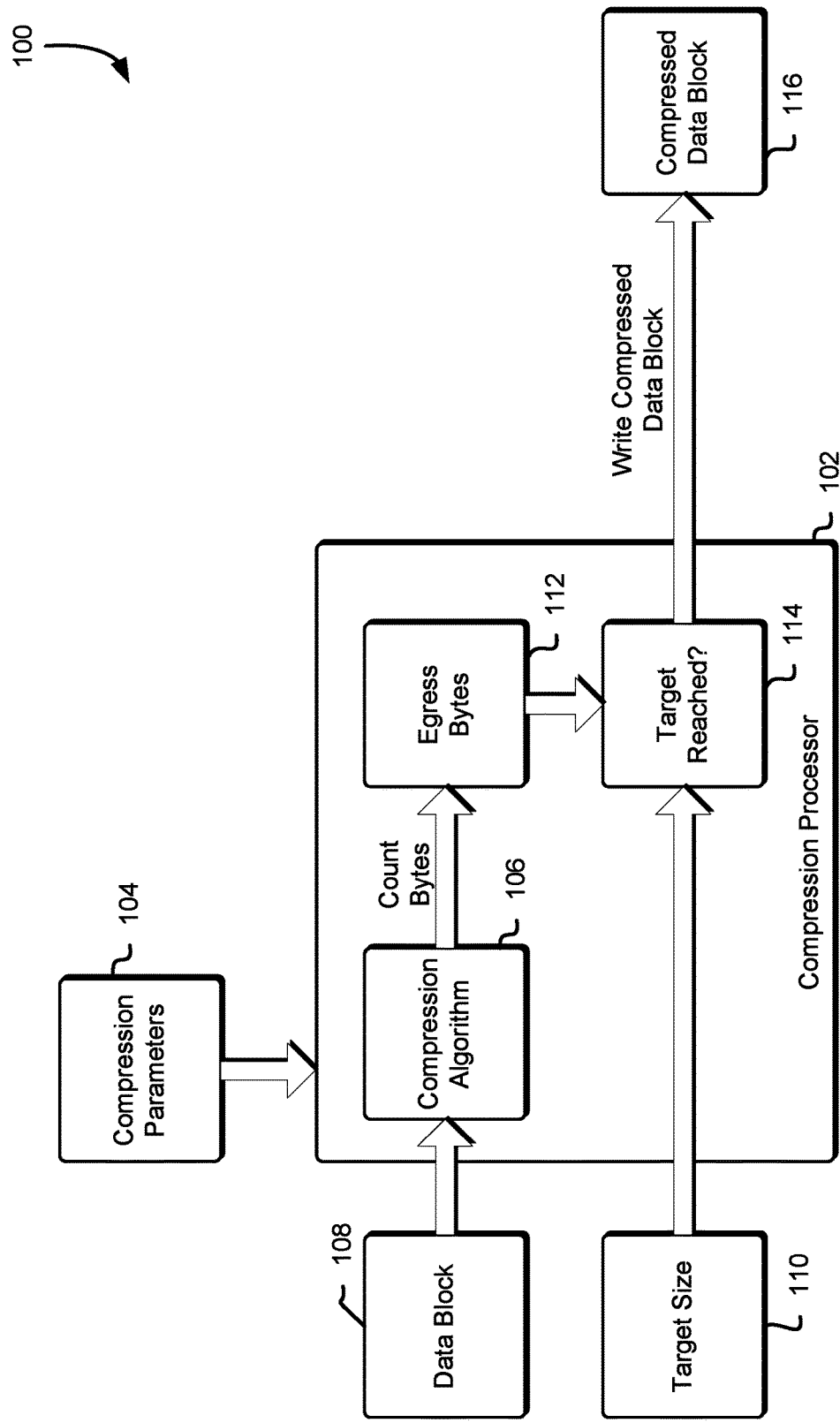
FIG. 1 illustrates an example environment with a compression processor which performs incremental block compression.

The following disclosure describes techniques for using a compression processor to perform incremental block compression. The disclosed systems and methods are directed towards incremental block compression, such that incremental compression can be used to create a compressed block that is a particular file size or threshold value, such as a compression target block size. These systems and methods may be implemented in hardware or software, such as using a dedicated processor configured to implement incremental block compression.

For example, a first processing unit may include a central processing unit (CPU), and a second processing unit may include a processor configured to communicate with the CPU and configured to compress data. The processor receives input data and compression parameters. The input data may be received in a number of formats, including being received as a scatter-gather list indicating memory locations of the data that is to be compressed. The compression parameters include a compression algorithm to use in compressing the data, and may include other parameters such as various settings within that algorithm to use for compressing data. The input data is compressed based at least in part on a compression target block size that can be determined in a number of ways. For example, the compression target block size may be received as part of the compression parameters, or the compression target block size may be based on a disk block size that is used in a particular storage location. In the latter case, the processor can be configured to determine a disk block size of the output storage location, and to use that disk block size as the compression target block size.

The processor performs incremental compression on the input data. For example, the processor begins compressing the input data and, as the data is compressed to produce a set of compressed data, determines the data size of a set of compressed data by, for example, counting egress bytes to determine if the size is larger than the compression target block size. If the size is less than the compression target block size, the processor then compresses further portions of the input data, until the total egress data is equal to the compression target block size. If compressing an additional portion of the input data and adding that to the egress data would push the size of the egress data over the compression target block size, instead, the in-progress compression operation (i.e., the last compression operation) is stopped at the processor and the egress data (without the in-progress compression operation portion) is saved as a compressed block. If the compressed block is less than the compression target block size, padding may be added to the end of the compressed block to increase its size to equal that of the compression target block size. The processor also writes metadata regarding the compressed block, indicating which atomic units of the plurality of atomic units are stored in the output data file.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 with a compression processor which performs incremental block compression in accordance with some embodiments. The compression processor 102 may be implemented in hardware, in software, as virtual hardware, or as a combination of these implementations. For example, the compression processor 102 may be implemented as a co-processor. The compression processor 102 is configured to receive compression parameters 104, a data block 108, and a target size 110. For example, the target size 110 may be a compression target block size, such that the compression processor 102 is configured to compress data, received in the data block 108, into a given target size 110. The target size 110 may be received by the compression processor 102, or may be inferred based on other information, such as a storage block size on a given storage location. The data block 108 may be received by the compression processor 102 in a number of formats, and includes the data that is to be compressed in a given compression operation. For example, the data block 108 may include a listing of memory locations where the data to be compressed is stored.

The compression parameters 104 may be received from another device, another processor, or some other source. The compression parameters 104 may include a number of different pieces of information. For example, the compression parameters 104 may specify a compression algorithm 106 to be used during a particular compression operation. The compression processor 102 may be configured to use a number of different compression algorithms 106 in order to compress a given data block 108. The compression parameters 104 may further include one of more compression settings to use with a given compression algorithm 106.

The compression processor 102 may be configured to receive compression parameters 104 and a data block 108, and use a compression algorithm 106 in order to compress at least a portion of the data block 108, forming egress bytes 112 of the set of compressed data. The compression processor 102 may be manufactured with circuitry for performing the compression algorithm. The compression processor 102 may also be configured as an application-specific integrated circuit ("ASIC"), a graphics processing unit ("GPU"), a direct memory access circuit ("DMA circuit"), a system-on-a-chip ("SoC"), or a field programmable gate array ("FPGA") that specifies the compression algorithm. The compression processor 102 may also have the compression algorithm installed using flash memory. In some embodiments, the compression processor 102 may load the compression algorithm 106 and/or the compression parameters 104 from software stored in memory associated with a processor of a computer system.

The compression processor 102 may count the bytes of the egress bytes 112, and compare the bytes of egress bytes to the target size 110 in order to determine if the target is reached 114. For example, the data block 108 can be broken up into smaller portions of data, and each of those portions of data may be iteratively compressed using the compression algorithm 106 in order to form egress bytes 112. When the number of egress bytes 112 is equal to the target size 110, the target is reached 114. In some embodiments, when the number of egress bytes 112 is less than the target size 110, but within a threshold value of the target size 110, the target is reached 114. At this point, the compression processor is configured to write the compressed data block 116 or set of compressed data to a storage location along with one or more metadata items associated with the compression. It should be noted that the compression engine has functionality to stop processing remaining data once the threshold value of the target size 110 is reached. This functionality is described in more detail below.

Figure 2:
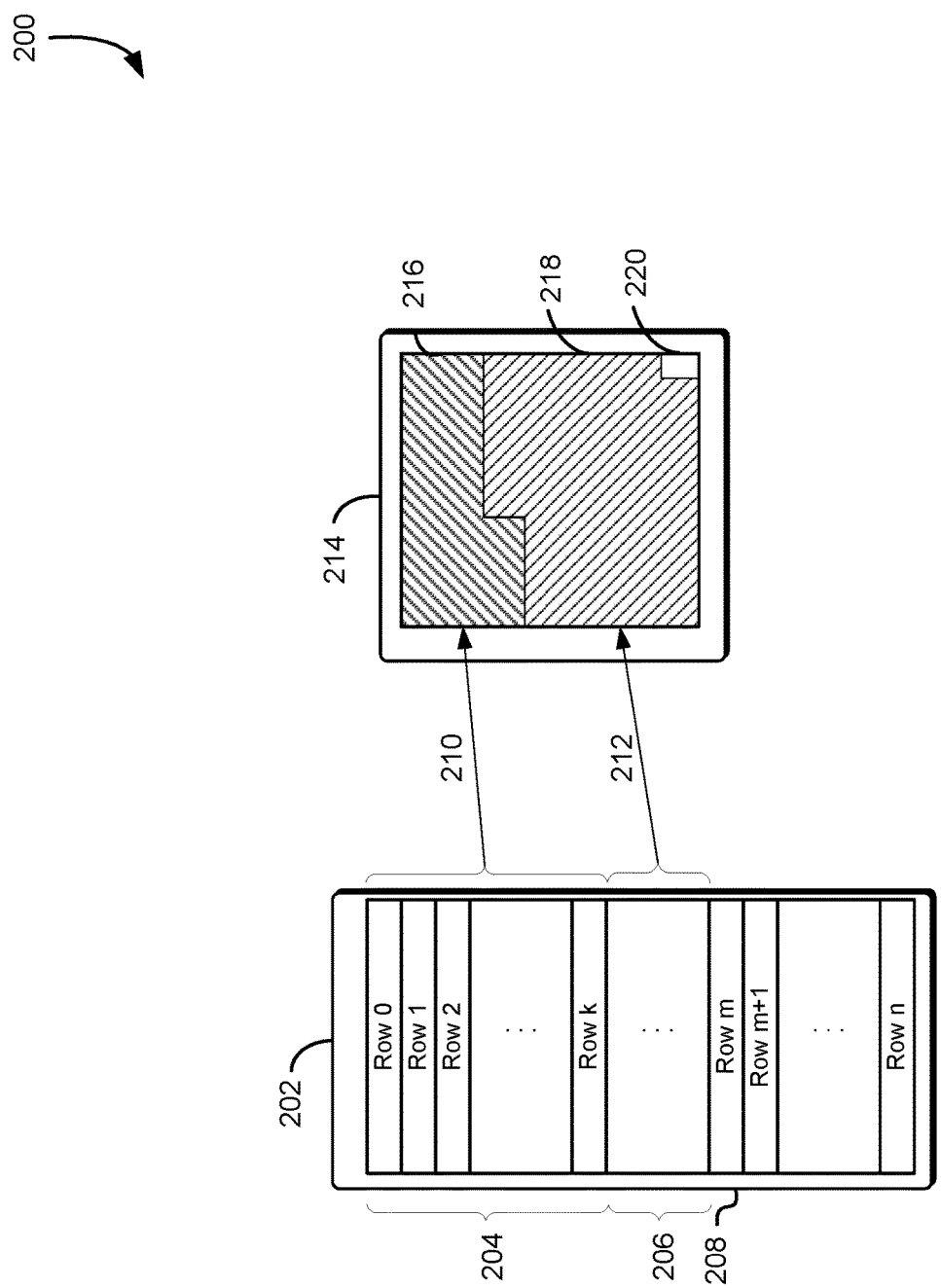
FIG. 2 illustrates an example approach to incrementally compressing block data using a compression processor.

FIG. 2 illustrates an example approach 200 to incrementally compressing block data using a compression processor as described in connection with FIG. 1 and in accordance with an embodiment. This approach may be carried out, as described above, by either a hardware compression device or a software compression device. For example, the example approach 200 may be carried out by a processor or a compression co-processor. In some aspects, data compression may be a very processor-intensive task, so it can be advantageous to use a co-processor for data compression.

Input data 202 may be received by the processor. The input data 202 may be received in any number of formats, such as a scatter-gather list which indicates memory positions, may be received as data transmitted over a network, may be received as data stored locally on transient or persistent memory. The input data 202 may be received in any number of formats, but is here illustrated as including a number of rows of a table, which corresponds to an "atomic unit" as described below. Other formats of input data may also be used as well, without causing significant changes to the method described here.

The processor is instructed to compress the input data 202 using a number of compression parameters. These compression parameters specify, e.g., what compression algorithm to use, and what compression settings to use. The processor may also be instructed on where to store the output data 214. Based on these instructions, the processor determines a compressed target block size, illustrated by the size of the solid line around the output data 214. For example, this compressed target block size may be received as part of the compression parameters. The processor may also determine the compressed target block size based on a disk block size of a particular storage location.

The storage location may comprise non-volatile storage such as magnetic storage (e.g., hard disk drives), solid-state storage drives, media used for sequential writes (e.g., tape media or shingled magnetic recording (SMR) drives), and/or other types of storage devices. This storage may comprise a single storage device or multiple storage devices. Storage devices typically implement block-based storage schemes, which require that set of compressed data be stored in blocks. These blocks are typically a uniform size on the same storage device, although that size can vary between different devices. For example, a disk block size may be one of 512 bytes, 4 kB, 1 MB, or other sizes. Because of this block-based storage, it may be advantageous for the compression algorithm to concatenate compressed blocks together or to compress data incrementally until reaching a particular compressed target block size, where the compressed target block size is equal to the disk block size of the storage device.

At a first step, the processor selects a first portion 204 of the input data 202. The processor may select the first portion 204 of the input data based at least in part on a compression algorithm operating on the processor. For example, the compression algorithm may be analyzed to determine what the maximum inflation ratio of the algorithm is (i.e., what is the maximum data size increase that can be caused by the compression). The maximum inflation ratio of a compression algorithm is generally something more than one. For example, a compression algorithm may have a maximum inflation ratio of 1.25, which means that, in the worst case, a 1 megabyte ("MB") file will be "compressed" to 1.25 MB. Based at least in part on this maximum inflation ratio, the first portion 204 of the input data can be selected. So with a maximum inflation ratio of 1.25 and a block size of 1 MB, a first portion 204 of input data that is 0.8 MB might be chosen, since 1.25 times 0.8 MB is equal to 1.0 MB.

Here, the processor selects from row 0 to row k of data. A number of different selection criteria may be used in selecting the first portion 204. For example, the processor may determine portions to compress based on the difference in size between the output data 214 and the compressed target block size. As an illustrative example, when selecting a first portion 204 for compression, if the compressed target block size is 1 MB, the processor may first compress approximately 0.5 MB, 1 MB, 1.5 MB, or another amount of input data, based on the compressibility of the data. For example, data with more repeated elements may be more compressible while data with fewer repeated elements may be less compressible. The size of the selected portions may also be received by the processor as part of the compression instructions or the compression parameters. The processor, after selecting a first portion 204 for compression, compresses 210 the first portion 204 as a compressed first portion 216. The processor compares the data size of the compressed first portion 216 plus any output data 214 to the data size of the compressed target block size. Here, since this is the first piece being compressed, and since the compressed first portion 216 is smaller than the compressed target block size, the compressed first portion 216 is added to the output data 214.

As illustrated, the compressed first portion 216 may be such that the output data 214 is smaller than the compressed target block size. Accordingly, the processor selects a second portion 206 for compression, compresses 212 the second portion 206 to form a compressed second portion 218, using incremental compression. This compression is done in a manner similar to how the first portion 204 was compressed, and uses the same compression parameters. The file size of the output data 214 (which is compressed first portion 216) and the compressed second portion 218 are compared to the compressed target block size. As illustrated, the compressed first portion 216 and the compressed second portion 218 are, when combined, smaller than the compressed target block size. Therefore, the processor stores the compressed second portion 218 in the output data 214.

After compressing the first portion 204 and the second portion 206, the processor compresses a third portion 208, which here is row m. As before, the size of the portion chosen may be based on the difference between the file size of the current output data (that is, compressed first portion 216 and compressed second portion 218) and the compressed target block size. If the difference between these two sizes is small, smaller portions may be chosen. Here, the illustrated size difference is small such that the third portion 208 is only a single row. The processor compresses the third portion 208. After compressing the third portion 208, the processor determines that the number of output bytes of output data 214, when including the third portion 208, would exceed the compressed target block size. Therefore, the third portion 208 is not included in the output data 214. Instead, the third portion 208 is flushed from memory.

The processor adds an amount of padding 220 to the end of the output data 214, in order to give the output data 214 the size of the compressed target block size. The output data 214 may then be written to a storage location, such as the output storage device specified in the compression instructions. The processor further may record metadata about the output data 214, such as the number of bytes or rows stored in the output data 214. It may be observed that in this manner, the processor is able to perform incremental compression based on the original compression instructions, without requiring further input from any external sources, such as further instructions. Depending on the compression instructions, the processor may be configured to discard the remaining rows, or to begin another compression block beginning at the last row not included in the previous compression block, which is here row m.

Figure 3:
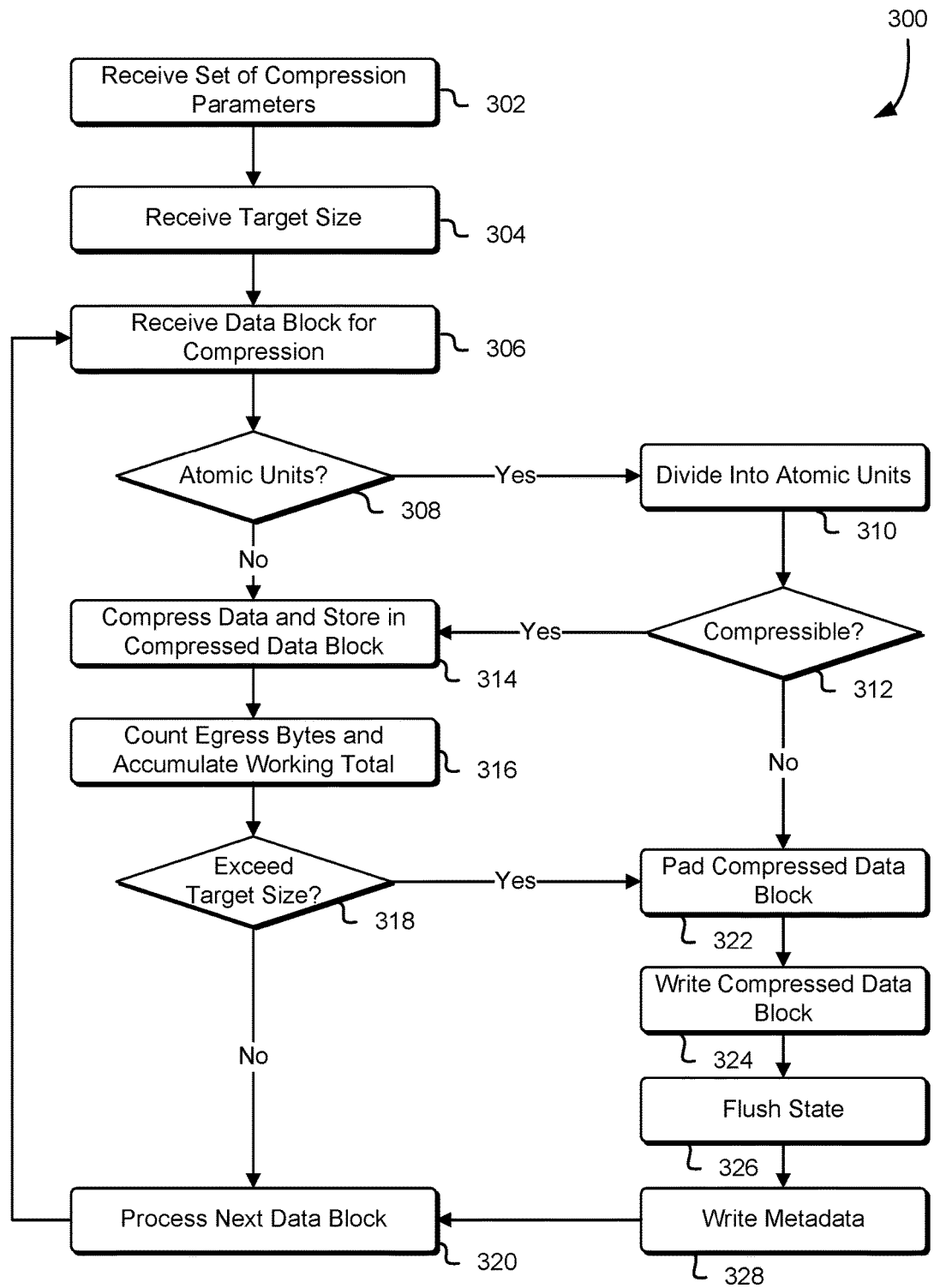
FIG. 3 illustrates an example process for incrementally compressing block data using a compression processor.

FIG. 3 illustrates an example process 300 for incrementally compressing block data using a compression processor as described in connection with FIG. 1 and in accordance with an embodiment. A compression processor such as the compression processor 102 described in connection with FIG. 1 may perform the example process 300 illustrated in FIG. 3. First, a compression processor receives a set of compression parameters 302, such as an indication of a compression algorithm to use and compression settings to use in connection with that compression algorithm. The compression processor also receives a target size 304, which indicates a size, such as in bytes, that is desired for a particular compressed data block. The compression processor then receives a data block for compression 306.

The compression processor determines if atomic units 308 are being used in a particular compression operation. For example, this may be indicated in the received compression parameters 302, as well as a size of atomic units which might be used. If atomic units are being used, the compression processor divides the data block into atomic units 310. The compression processor may then determine if the atomic unit is compressible 312, such as in the case where atomic units which are not compressible may be stored in an uncompressed format in a given compressed data block. As used herein, an "atomic unit" is the smallest unit of a set of data that may be compressed. For example, if the data to be compressed is retrieved from a database, a table of the database or a single row of a table of the database may be the atomic unit. In another example, an atomic unit may be determined based on data size (e.g., 128 kilobytes ("kB") of data), or time (e.g., one minute of log data), or some other such determination. In some embodiments, an atomic unit may be specified with the compression parameters and based at least in part on an experimental determination of an optimal atomic unit.

If atomic units are not being used, or if the atomic units are compressible, the compression processor compresses data and stores it in a compressed data block 314. The compression processor is also configured to count a number of egress bytes from the compressed data and accumulate a working total 316. This working total of egress bytes may represent a total file size of a current output block, for example. The compression processor determines if the working total of bytes exceeds the target size 318. For example, if the target size is 1 MB, the compression processor determines if adding the current data block to the compressed data block would increase the size of the compressed data block to be larger than 1 MB. If the compressed data block is still smaller than the target size, the compression processor processes the next data block 320, if such a next data block exists.

If the working total exceeds the target size, or if atomic units are not compressible, the compression processor may pad 322 the compressed data block. For example, if the working total is 1 kB short of the target size, 1 kB of padding may be added to the compressed data block, to bring the size of the compressed data block up to the target size. The compression processor then writes 324 the compressed data block. For example, the compressed data block may be written to permanent storage such as a disk drive or another form of storage medium. The compression processor then flushes 326 its own state in order to prepare for future operations. The compression processor also writes 328 metadata, such as associating metadata with a particular compressed data block. This metadata can include information such as the particular data that is stored in a compressed data block, the type of compression used on the compressed data block, or how effectively the data in the compressed data block was compressed.

As described above, one type of data that can be compressed is a key-value store, in which rows of a table or other database are compressed to reduce the overall size of the database. Generally, the goal of such compression may be to compress as many rows as possible into a single block. For example, the block size here may be 1 MB, based on a storage block size used in a given storage location, and so the goal may be to compress as many rows as possible into 1 MB. However, one difficulty in fitting as many rows as possible into a block size is that it isn't known ahead of time how compressible the data might be. For example, compression factors for a given row or given data may vary widely, from values such as 0.9 times (i.e. "0.9×") to over 100 times (i.e., "100×").

Figure 4:
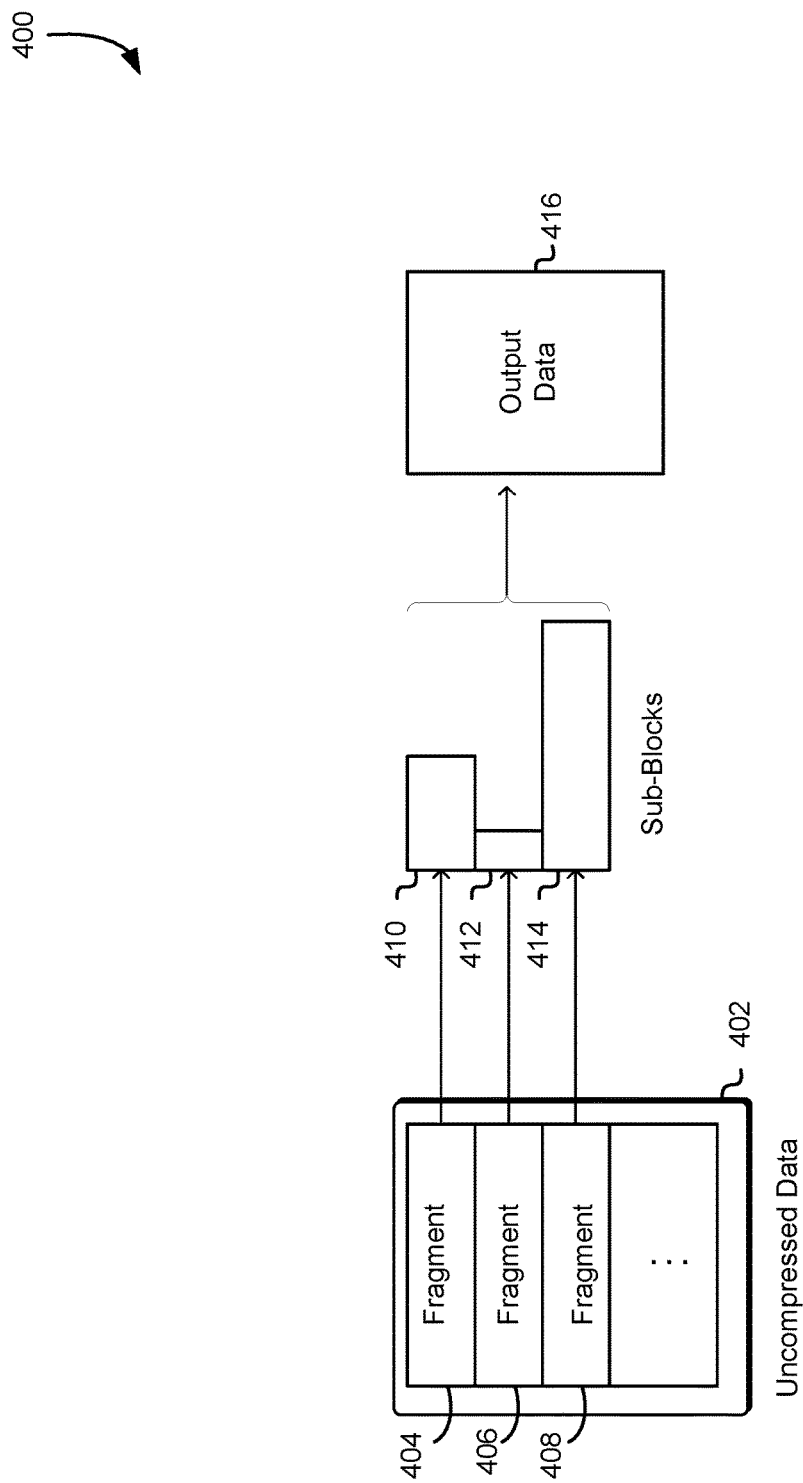
FIG. 4 illustrates an example approach to incrementally compressing block data using a compression processor.

FIG. 4 illustrates an example approach 400 to incrementally compressing block data using a compression processor as described in connection with FIG. 1 and in accordance with an embodiment. The processor begins compressing the uncompressed data 402 by selecting fragments 404, 406, and 408. In some aspects, the size of these fragments may correspond to an atomic unit of the uncompressed data 402. The fragments 404, 406, and 408 may be any size, such as each fragment being the same size as one another, or fragments with different sizes. For example, the fragments 404, 406, and 408 may be the same size as each other, such as using 4 kB fragments. The fragments may also be selected based at least in part on the maximum inflation ratio of the compression algorithm as described above.

Each fragment of the fragments 404, 406, and 408 may be compressed into a corresponding compressed sub-block 410, 412, and 414. Any number of different compression algorithms may be used for this compression. For example, this compression may be done using GNU gzip ("gzip"), Lempel-Ziv-Oberhumer compression ("LZO"), a byte-oriented compression scheme such as "LZ4," or another compression algorithm. Different data can compress with different compression ratios, based on a number of factors such as the amount of repetition within the data set. Accordingly, while each fragment of the fragments 404, 406, and 408 may be the same size as one another, each compressed sub-block 410, 412, and 414 may be a different size from one another. For example, compressed sub-block 410 may be 2 kB, while compressed sub-block 412 may be 500 bytes, and compressed sub-block 414 may be 4.2 kB.

As each of the compressed sub-blocks 410, 412, and 414 is compressed, they may be added to the output data 416. The output data 416 may be configured to be a compressed target block size, such as being a block size used for a particular storage location. For example, in some storage locations, this block size might be a 1 MB block size. Thus, the output data 416 may be made up of the number of concatenated compressed sub-blocks 410, 412, and 414 needed to ensure that the output data 416 is an appropriate size. If the output data 416 is slightly smaller than the compressed target block size, but adding another compressed sub-block would result in output data 416 larger than the compressed target block size, padding may be used to increase the size of the output data 416 to the block size.

Two problems may arise from this approach 400 to compressing data. First, small fragments, such as the fragments 404, 406, and 408, are generally less compressible than large fragments when using most modern compression schemes. Using modern compression algorithms (such as gzip, LZO, or LZ4), compressing smaller fragments of data may degrade the compression ratios that can be attained. Compression generally can be based on identifying repeated patterns in data, and finding ways to express those patterns more efficiently. Larger fragments of data will generally include more repetition than smaller amounts of data. This enables more efficient compression for a large fragment of data rather than for a small fragment of data. Thus, by using small fragments, compression ratios are lower than what may be obtained if larger fragments were used.

However, if larger fragments are used, fragmentation may become a significant problem. As described above, the output data 416 is based on the compressed target block size, such as 1 MB on a storage medium where that is the appropriate block size. If adding another compressed sub-block to the output data 416 would push the output data 416 over the size of the compressed target block size, padding is instead added to the output data 416 in order to increase its size to that of the compressed target block size. Generally, the use of larger fragments will lead to larger compressed sub-blocks than using smaller fragments. Thus, the use of larger fragments may necessitate the use of more padding at times, thus reducing the overall efficiency of the compression, and increasing fragmentation of the compressed data. For example, consider if the compressed target block size is 1 MB and 256 kB fragments were used. In this case, the current output data may be 800 kB, but adding another compressed sub-block to the output data would result in the output data being larger than 1 MB. In this situation, 224 kB of padding may be added to the output data before the output data is written to the storage location. Accordingly, it may be observed that nearly one-quarter of the output data is padding, which will result in a large loss of compression efficiency. Accordingly, it can be observed that using small fragments can greatly hinder the compression efficiency, but the small fragments may result in less padding. Conversely, using larger fragments can result in higher compression efficiencies on any given compressed sub-block, but large fragments may result in the use of more padding.

A second approach has also been used for compressing data. In this approach, incremental compression may be used on each row, until the output data reaches a compressed target block size, such as 1 MB. Each compressed block of output data is compressed independently, in order to enable random access between the various compressed blocks. However, this approach may be significantly slower than approach 400, especially when using a compression processor due to communication overhead.

Typically, data compression is a processor-intensive task. Because of this, data compression can be offloaded to a dedicated co-processor, in order to allow a central processor or other processor to do other tasks while data compression is ongoing. This offloading itself entails a few complications. For example, communication overhead for managing a co-processor is not negligible, such that it is desirable to avoid synchronous calls to the co-processor. A synchronous call, in this context, may refer to a process where a processor generates a command, transmits it to the co-processor, waits for the completion of the command by the co-processor, and only then generates a next command.

Figure 5:
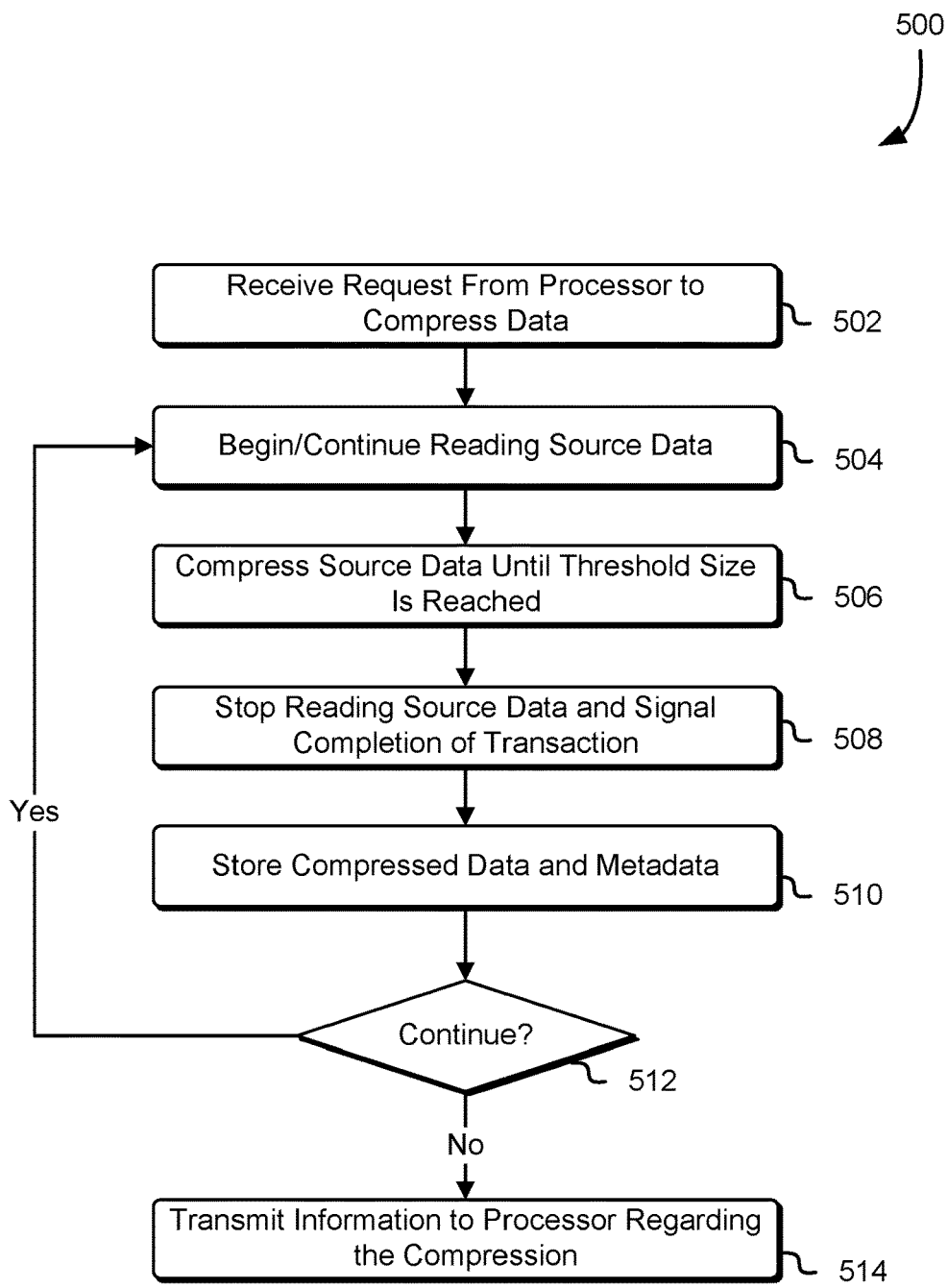
FIG. 5 illustrates an example process for incrementally compressing block data using a compression processor.

FIG. 5 illustrates an example process 500 for incrementally compressing block data using a compression processor as described in connection with FIG. 1 and in accordance with an embodiment. A compression processor such as the compression processor 102 described in connection with FIG. 1 may perform the example process 500 illustrated in FIG. 5. The example process 500 illustrated in FIG. 5 performs the compression according to a second approach, which is different that the approach illustrated in connection with FIG. 4. In this method, a compression processor receives requests from the processor, which is itself directing the compression. This compression may ultimately result in compressed output data much like that illustrated in FIG. 2, but may be much more efficient due to a reduction in communication overhead.

At block 502, the compression processor receives a request from the processor to compress the data. This request can include a number of compression parameters, such as the algorithm to use and compression parameters to adjust.

At block 504, the compression processor begins reading the source data and compressing 506 the source data until the threshold size is reached. This results in compressed data, which has a given file size. This compression may be similar to the compression described in connection with FIG. 2, and may result in compressed data that is similar to compressed data described in connection with FIG. 2. The compressed data may be stored in either volatile or persistent storage by the compression processor or the processor.

During the compression, the compression processor transmits information to the processor regarding the compression of the data. For example, the co-processor might report to the processor the file size of the compressed data, in order to allow the processor to determine whether to select subsequent data to add to a possible output block, the size of such subsequent data, or other options that might be available to the processor. This may be an example of synchronous communication, where the compression processor completes a single step, here compressing the data, and then waits for instructions on further steps that it might take.

At block 508, when the compression processor determines that the threshold size has been reached, the compression processor may then stop reading source data and signal the completion of the compression transaction. The compression processor may stop reading source data and signal the completion of the compression transaction based at least in part on a signal received from the processor or some other system.

At block 510, the compression processor stores the compressed data and/or any metadata associated with the compression and then, at block 512, the compression processor determines whether to continue by, for example, reading the next portion of the source data.

At block 514, the compression processor transmits information to the processor regarding the compression. This transmission may be similar to that found in block 508, with information including the completion of the compression transaction, and the resulting size of the compressed data.

As illustrated in the example process 500, such incremental compression using synchronous communication may result in a large number of messages being transmitted from the processor to the compression processor and from the compression processor to the processor. While the example process 500 describes a single compression operation, any number of operations may be required to create a compressed block that has a size equal to that of the compression target block size. With each added set of data, more communications between the processor and the compression processor may be required. This may add a large amount of communication overhead to the overall compression, and significantly slow the compression task.

It may be observed from the example process 500 that performing incremental compression can result in operating the compression processor in a non-optimized manner. For example, it may require the use of a synchronous interface in order to compress, wait for the completion of the compression, check if a block is above a block size threshold, and if not, transmit a next compression command. This problem may be further heightened when the incremental compressed portions are small, as this may increase overhead, deteriorate performance, and reduce CPU utilization.

Because of the non-negligible communication overhead between a processor and a co-processor, it may be advantageous to mitigate the communication overhead by transmitting commands asynchronously, such as feeding the co-processor a next command while it is still processing the current command. For example, as described above, it may be advantageous for the processor to instruct the co-processor to compress all of the input data, and operate in the manner described above without further instructions or communications between the processor and the co-processor.

Figure 6:
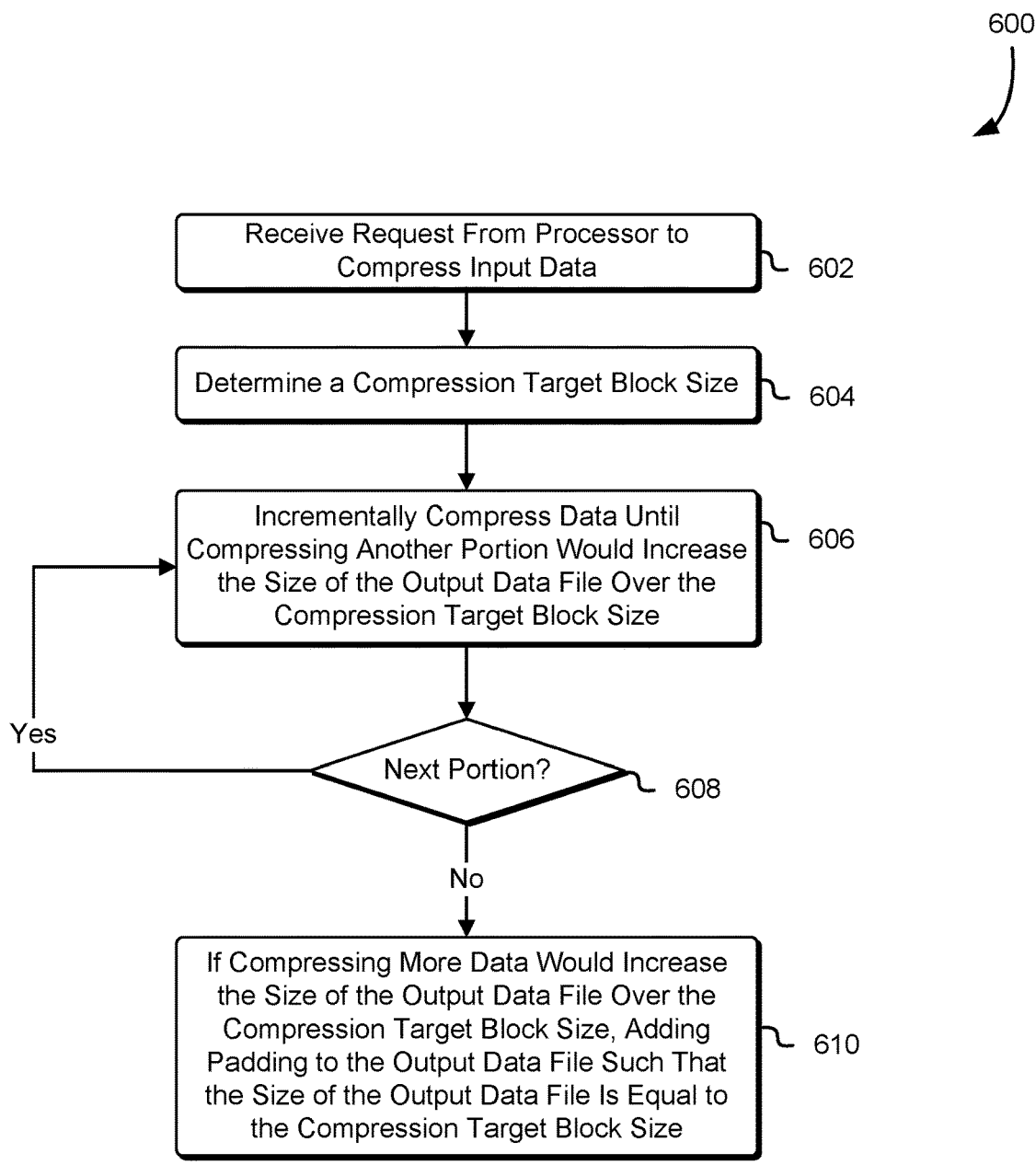
FIG. 6 illustrates an example process for incrementally compressing block data using a compression processor.

Therefore, it is desired to have a co-processor (i.e., a compression processor) which more efficiently solves the problems described above, and which can handle incremental compression to block boundaries. FIG. 6 illustrates an example process 600 for incrementally compressing block data using a compression processor as described in connection with FIG. 6 and in accordance with an embodiment. A compression processor such as the compression processor 102 described in connection with FIG. 1 may perform the example process 600 illustrated in FIG. 6.

At block 602, the co-processor receives a request from the processor to compress input data. The request may include the location of the input data, such as a scatter-gather list. The request may also include the input data itself. The request may include compression parameters, such as a compression algorithm to use and compression settings that may be used with that algorithm. In some aspects, the request may include an atomic block size, such as a row or a set of rows of a given key-value store. The request may also include a compression target block size, and may include a location to store the output data file that is created. The request may also include an indication of whether, after creating a first output data file, the co-processor should continue to create further output data files from the input data or whether the co-processor should stop.

At block 604, the co-processor determines a compression target block size. If the compression target block size is included in the request, determining a compression target block size may be reading this information from the request. If not, a compression target block size may be determined based on a storage block size in the storage medium to which the output data file will be written. For example, a storage block size may be 1 MB on a given output device, and so the compression target block size may also be 1 MB.

In some embodiments, the co-processor can divide the input data into a plurality of portions. This division may include, for example, determining a size of a first portion, and treating the remaining data as a second portion, which can be further divided later as part of an iterative process. The division into portions may be based, at least in part, on the compression target block size. For example, if the compression target block size is 1 MB, the first portion may be selected to be a size that is unlikely to exceed 1 MB compressed, based on the compressibility of the data. When an atomic unit size is used, the boundaries between the various portions of the data may be selected such that an atomic unit will not span multiple portions, but rather, that each atomic unit is contained within a single portion of the input data.

At block 606, the co-processor incrementally compresses portions to an output data file until compressing another portion would increase the size of the output data file over the compression target block size. This process may include, for example, compressing the first portion into an output data file which may be stored in persistent or volatile storage. The file size of the output data file may be compared to the compression target block size. Based on this comparison, a second portion may be divided from the remainder of the input data. For example, if the compressed first portion is 0.5 MB and the compression target block size is 1 MB, a second portion may be divided that is of a size that is unlikely to exceed 0.5 MB compressed. The second portion may then be compressed, and it may be determined if adding the second portion to the output data file would increase the size of the output data file to be larger than the compression target block size.

This process may be repeated any number of times in an iterative manner. With each new compressed portion added to the output data file, the file size of the output data file will continue to increase, and to grow closer and closer to the compression target block size. If adding a particular portion to the output data file would increase the size of the output data file beyond that of the compression target block size, a smaller portion may be selected. If it is not possible to select a smaller portion, such as if the current portion is a single atomic unit and that portion would increase the size of the output data file over the compression target block size, the iterative incremental compression will cease, and the process continues to decision 608.

At decision 608, it is determined whether, upon compressing another portion, the size of the output data file would be increased to a size that is greater than the target block size. If the size of the output data file would not be increased to a size that is greater than the target block size, then the process may continue at block 606. Conversely, if the size of the output data file would be increased to a size that is greater than the target block size, the process may continue at block 610.

At block 610, if it is determined that the co-processor, upon compressing another portion would increase the size of the output data file over the compression target block size, the co-processor may then add padding to the output data file such that the size of the output data file is equal to the compression target block size. That is, when the incremental compression is complete to the compression target block size, the output data file will either be the size of the compression target block size, or slightly smaller. In the case that the output data file is smaller than the compression target block size, padding is added to the output data file in order to increase its size to equal that of the compression target block size.

The request to the co-processor can specify that a given operation may be a single-block compression or a multi-block compression. In a single-block compression, the co-processor may then save the output data file to a storage location, and may flush the remaining input data portions. If the request to the co-processor was to compress all of the input data, the co-processor may, after saving the output data file to the storage location, create a new output data file and continue the process described above with respect to the input data portions that were not yet compressed into the previous output data file or files.

Input data received by the co-processor may be divided into atomic units. Each of these atomic units may be compressed, or may be uncompressed, as a whole. That is, the co-processor can be configured to either compress or not-compress an entire atomic unit, and cannot, for example, compress only half of an atomic unit. For example, if the input data is a key-value store, an atomic unit may be a row or a set of rows in that key-value store.

Generally, decisions about whether or not to add further atomic units to a given compression block may be made by the co-processor at the boundaries of atomic units, such as after adding a previous atomic unit to the compression block. The co-processor will also write a metadata descriptor for every computed compression block, listing how many uncompressed bytes and atomic units were used to generate the compressed block. The mechanisms described above integrate incremental compression flow into the co-processor, thus offloading the host-processor from managing the co-processor, which improves both performance and CPU utilization.

Figure 7:
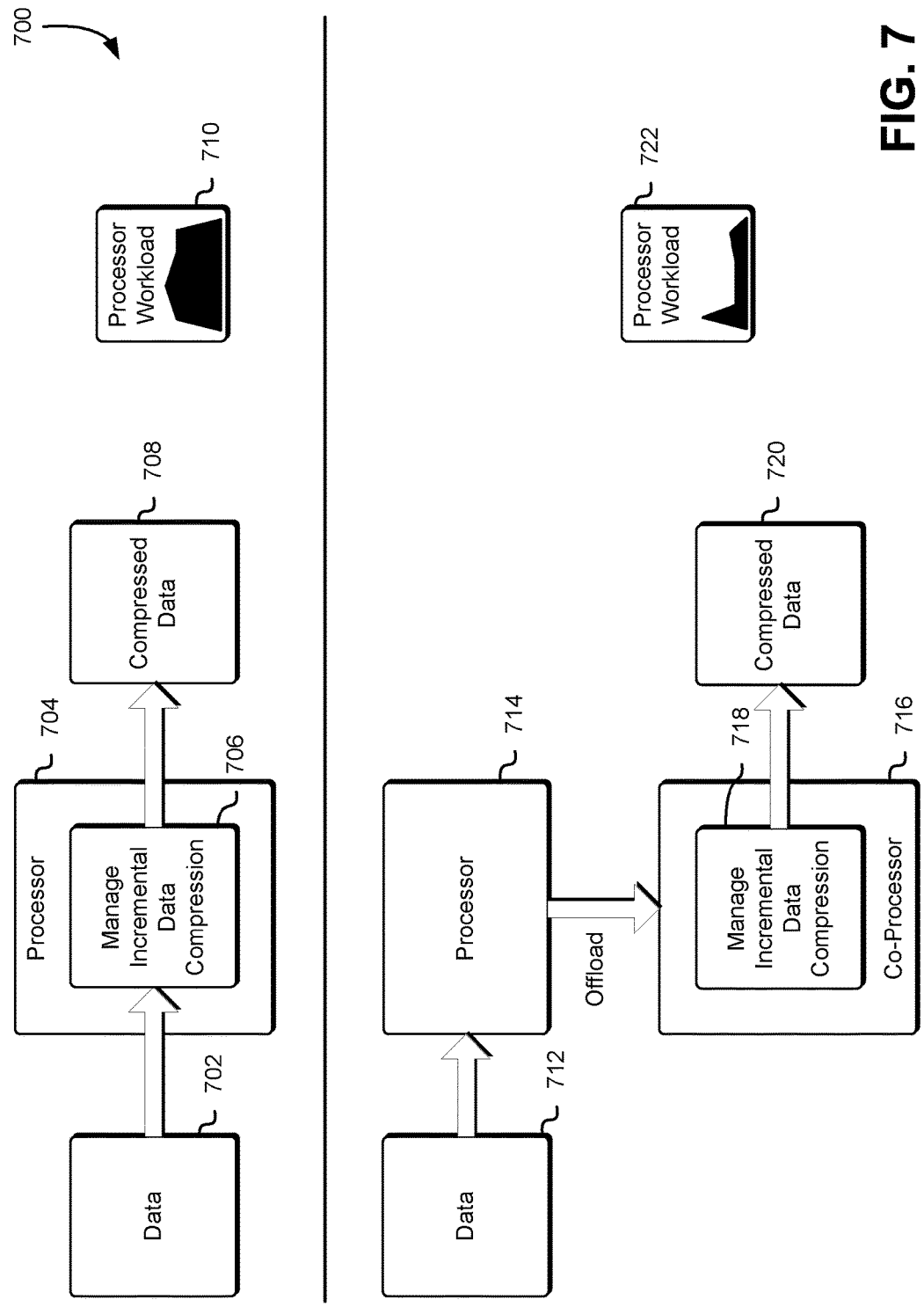
FIG. 7 illustrates an example data flow of using two alternative processes of incrementally compressing block data.

FIG. 7 illustrates an example data flow 700 of using two alternative processes of incrementally compressing block data as described in connection with FIG. 1 and in accordance with an embodiment. In a first process, data 702 is received by a processor 704, which itself manages incremental data compression 706. The processor 704 compresses the data in order to generate compressed data 708. As described above, data compression is a very processor-intensive task, and the processor workload 710 from such a process may be very high. This can be costly, as this can slow down both the compression operations, as well as slowing down all other functions from the processor 704.

Accordingly, it may instead be advantageous to offload this work to a co-processor 716. For example, a processor 714 may receive data 712 for incremental compression. However, instead of managing incremental compression itself, the processor 714 can be configured to offload managing incremental data compression 718 to a co-processor 716. Accordingly, the co-processor 716 can manage incremental data compression 718 in order to form compressed data 720. This may dramatically reduce processor workload 722, as it may be much more efficient to allow the co-processor 716 to manage incremental data compression 718, rather than having the processor 714 manage such compression, due to factors such as communication overhead.

Figure 8:
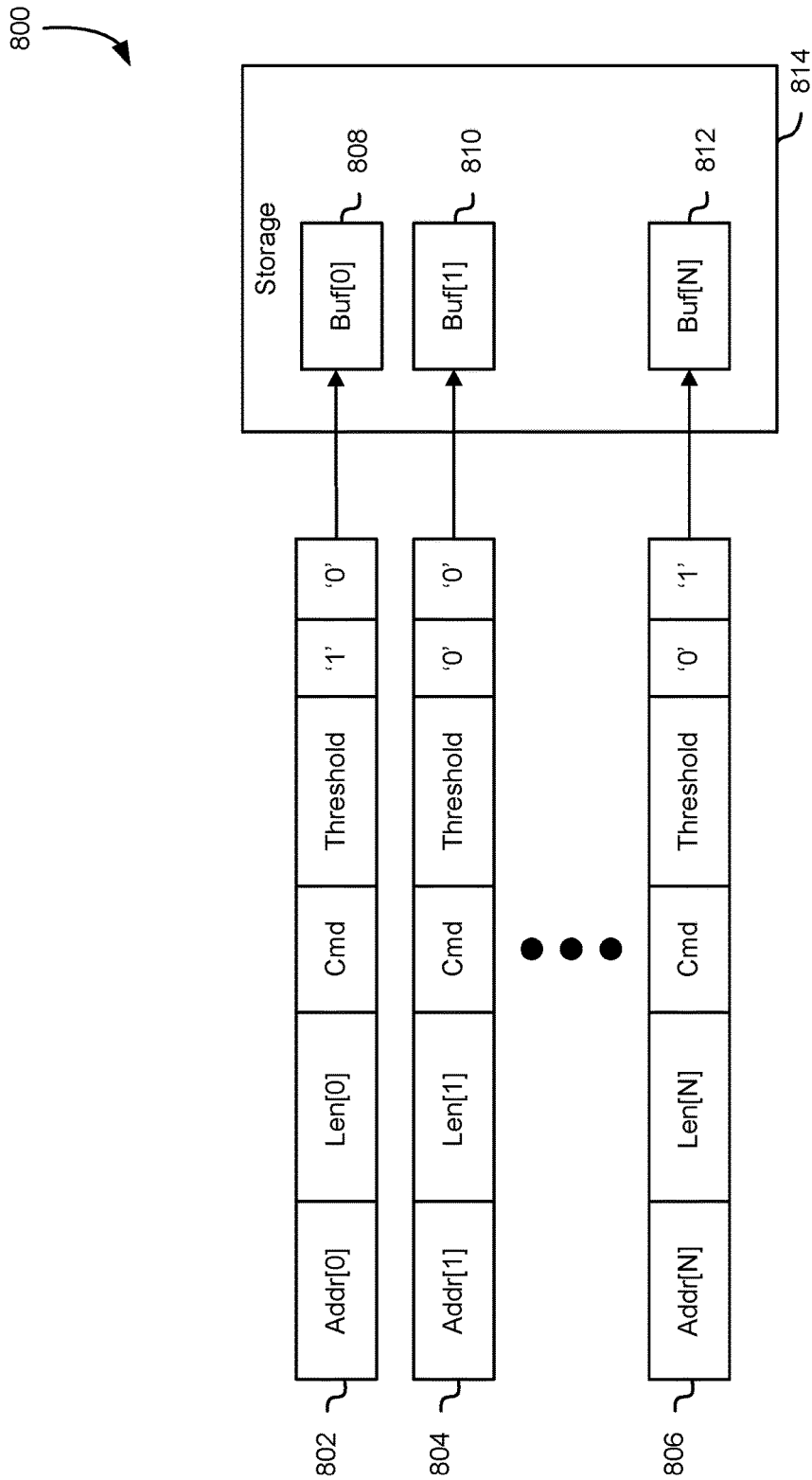
FIG. 8 illustrates an example diagram of source descriptors that may be used while incrementally compressing block data using a compression processor.

FIG. 8 illustrates an example diagram 800 of source descriptors that may be used while incrementally compressing block data using a compression processor as described in connection with FIG. 1 and in accordance with an embodiment. In the example diagram 800 illustrated in FIG. 8, a plurality of source descriptors associated with a data read transaction comprise a first source descriptor 802, a second source descriptor 804, and a third source descriptor 806 for a data read transaction are described (e.g., a read of compressed data from storage 814, decompressing the data, and writing the decompressed data to memory). The storage 814 may be as described herein. The first source descriptor 802, being the first source descriptor of a storage transaction, has its first bit field set to '1' and its last bit field set to '0.' If the storage transaction comprises only a single source descriptor, both the first bit field and the last bit field may be set to '1.' The second source descriptor 804, being neither the first nor the last source descriptor in the subject storage transaction, has both its first bit field and its last bit field set to '0.' There may be additional descriptors between the second and third source descriptors 804 and 806. The third source descriptor 806, being the last source descriptor in the subject storage transaction, has its first bit field set to '0' and its last bit field set to '1.' The first source descriptor 802 identifies a first buffer 808 in storage 814, the second source descriptor 804 identifies a second buffer 810 in storage 814, and the third source descriptor 806 identifies a third buffer 812 in storage 814. The locations in storage 814 identified by the source descriptors represent the compressed data to be retrieved from storage 814 for decompression and subsequent storage in memory.

Figure 9:
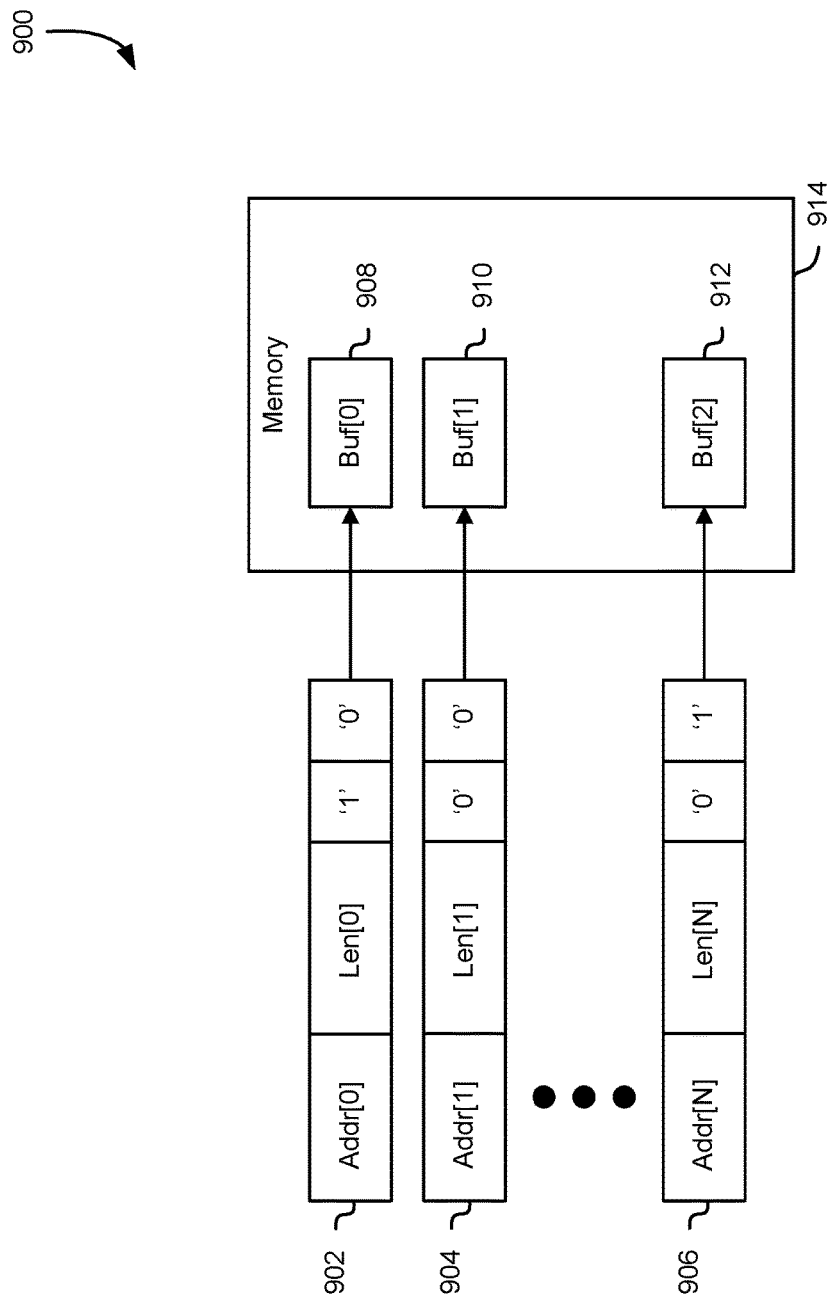
FIG. 9 illustrates an example diagram of destination descriptors that may be used while incrementally compressing block data using a compression processor.

FIG. 9 illustrates an example diagram 900 of destination descriptors that may be used while incrementally compressing block data using a compression processor as described in connection with FIG. 1 and in accordance with an embodiment. In the example diagram 900 illustrated in FIG. 9, a plurality of destination descriptors associated with the read data transaction are illustrated. The destination descriptors in this example include a first destination descriptor 902, a second destination descriptor 904, and a third destination descriptor 906. The destination descriptors need not specify the length or the command so these fields may be omitted from the destination descriptors. The first destination descriptor 902, being the first destination descriptor of a storage transaction, has its first bit field set to '1' and its last bit field set to '0.' If the storage transaction comprises only a single destination descriptor, both the first bit field and the last bit field may be set to '1.' The second destination descriptor 904, being neither the first nor the last destination descriptor in the subject storage transaction, may have both of its first bit field and last bit field set to '0.' The third destination descriptor 906, being the last destination descriptor in the subject storage transaction, may have its first bit field set to '0' and its last bit field set to '1.' The first destination descriptor 902 identifies a first buffer' 908 in memory 914, the second destination descriptor 904 identifies a second buffer' 910 in memory 914, and the third destination descriptor 906 identifies a third buffer' 912 in memory 914 into which the decompressed data is to be written.

A digital memory access ("DMA") engine (described below) reads compressed data from storage 814 at locations designated by source descriptors (as described in connection with FIG. 8). The DMA engine streams the compressed data read from storage to a compression/decompression engine. The compression/decompression engine decompresses the received compressed data and streams the decompressed data back to the DMA engine. The DMA engine writes the received decompressed data into the memory 914 at locations designated by the destination descriptors.

Figure 10:
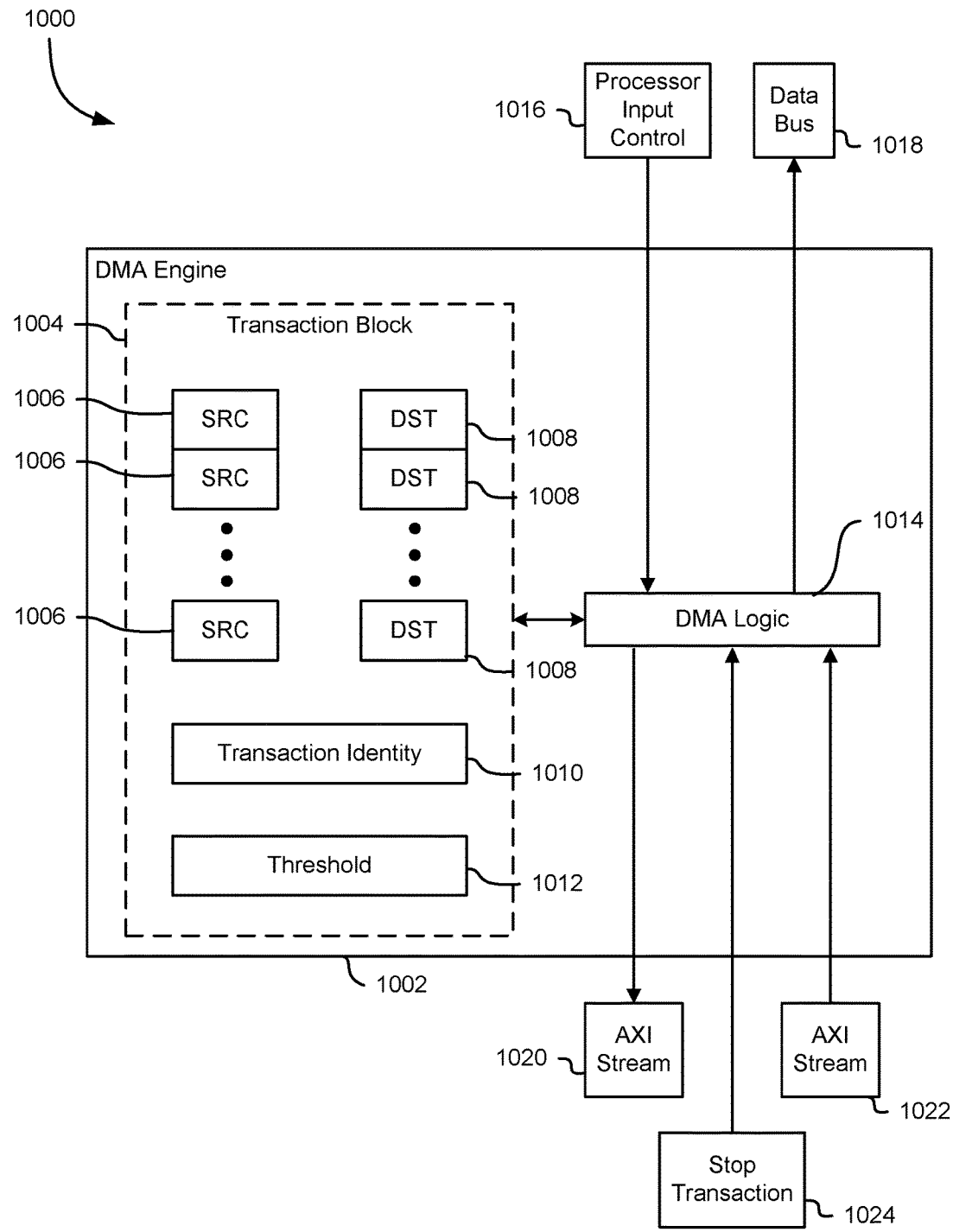
FIG. 10 illustrates an example environment where a DMA engine may be used to incrementally compress block data using a compression processor.

FIG. 10 illustrates an example environment 1000 where a DMA engine may be used to incrementally compress block data using a compression processor as described in connection with FIG. 1 and in accordance with an embodiment. FIG. 10 illustrates an embodiment of a DMA engine 1002. A DMA engine 1002 in combination with a compression/decompression accelerator (also referred to herein as a "compression/decompression engine") may be used to obtain a selected portion of decompressed data from a block of compressed data. In response to a read request from a CPU, the DMA engine 1002 reads compressed data from storage and provides the stream of compressed data to the compression/decompression accelerator for decompression of the data. The DMA engine 1002 also may provide a threshold value, supplied to it by the CPU, to the compression/decompression accelerator to indicate where data of interest is located relative to the decompressed block of data. When the compression/decompression accelerator decompresses the block of data from its initial data values (e.g., bytes) to the indicated threshold in the decompressed data, the compression/decompression accelerator may stop further processing of compressed data and may send a transaction stop signal to the DMA engine 1002. In some embodiments, the DMA engine 1002 may further send a transaction identity, such as a transaction number, to the compression/decompression accelerator on initiation of a data decompression transaction. In such cases, the compression/decompression accelerator sends the transaction with the transaction stop signal to the DMA engine 1002.

When the DMA engine 1002 receives the transaction stop signal the DMA engine 1002 may cease reading additional compressed data, thereby conserving the processing time and power the DMA engine 1002 otherwise would have consumed in reading the remainder of the compressed data block. The conserved processing time may be used to perform other storage access processing, thereby reducing the latency, and increasing the throughput of the storage system that may include the DMA engine 1002.

The DMA engine 1002 may comprise a DMA logic block 1014. In some contexts, the DMA logic block 1014 may be referred to as a controller component. The DMA engine 1002 further may comprise one or more transaction blocks. A transaction block 1004 may be a hardware component or an area in local memory of the DMA engine 1002 (e.g., a block of local memory that is dynamically allocated by the DMA logic block 1014 to perform a transaction on the data storage as described above). The transaction block 1004 may store information about a storage transaction, for example a plurality of source descriptors 1006, a plurality of destination descriptors 1008, a transaction identity 1010, and a threshold 1012. The transaction block 1004 also may be referred to herein as a control buffer. In a data write transaction (i.e., where uncompressed data transmitted from an application to be compressed and written to storage) the transaction block 1004 may not include a transaction identity 1010 and/or a threshold 1012.

The DMA logic block 1014 may receive control inputs from a processor via processor input control 1016, for example a storage transaction command, source descriptors 1006, destination descriptors 1008, and possibly other control parameters such as a threshold 1012 or location value and/or an identification of a compression algorithm or a decompression algorithm to be used in the storage transaction. In some embodiments, the DMA engine 1002 couples to the memory and the storage via a single data bus 1018 and thus reads uncompressed data from and writes decompressed data to the memory using the data bus 1018 as well as writes compressed data to and reads compressed data from the storage using the same data bus 1018. In other embodiments, the DMA engine 1002 couples to the memory and to the storage via separate buses. That is, the data bus 1018 may represent a single bus or multiple buses. The DMA logic block 1014 may create and store a transaction identity for a data storage read transaction in the transaction identity 1010.

During a write operation, the DMA engine 1002 may stream uncompressed data via, for example, an advanced extensible interface ("AXI") stream such as the first AXI stream 1020. The compression/decompression engine may compress the data according to a compression algorithm that may be defined or selected by the DMA engine 1002 and may stream the compressed data back to the DMA engine 1002 via a second AXI stream 1022. It should be noted that "AXI" and "AXI stream" are defined according to specifications defined by the advanced microcontroller bus architecture ("AMBA"), an open-standard, on-chip interconnect specification for the connection, and management of functional blocks in system-on-a-chip ("SoC") designs.

The DMA logic block 1014 provides read and write control in response to commands and parameters received on the processor input control 1016 as well as in response to the stop transaction signal 1024 and the second AXI stream 1022. The processor input control 1016 may be referred to in some contexts as a control interface. In some contexts, the DMA logic block 1014 may be referred to as a state machine. Other architectures for the DMA engine 1002 from that shown in FIG. 10 are possible as well.

Figure 11:
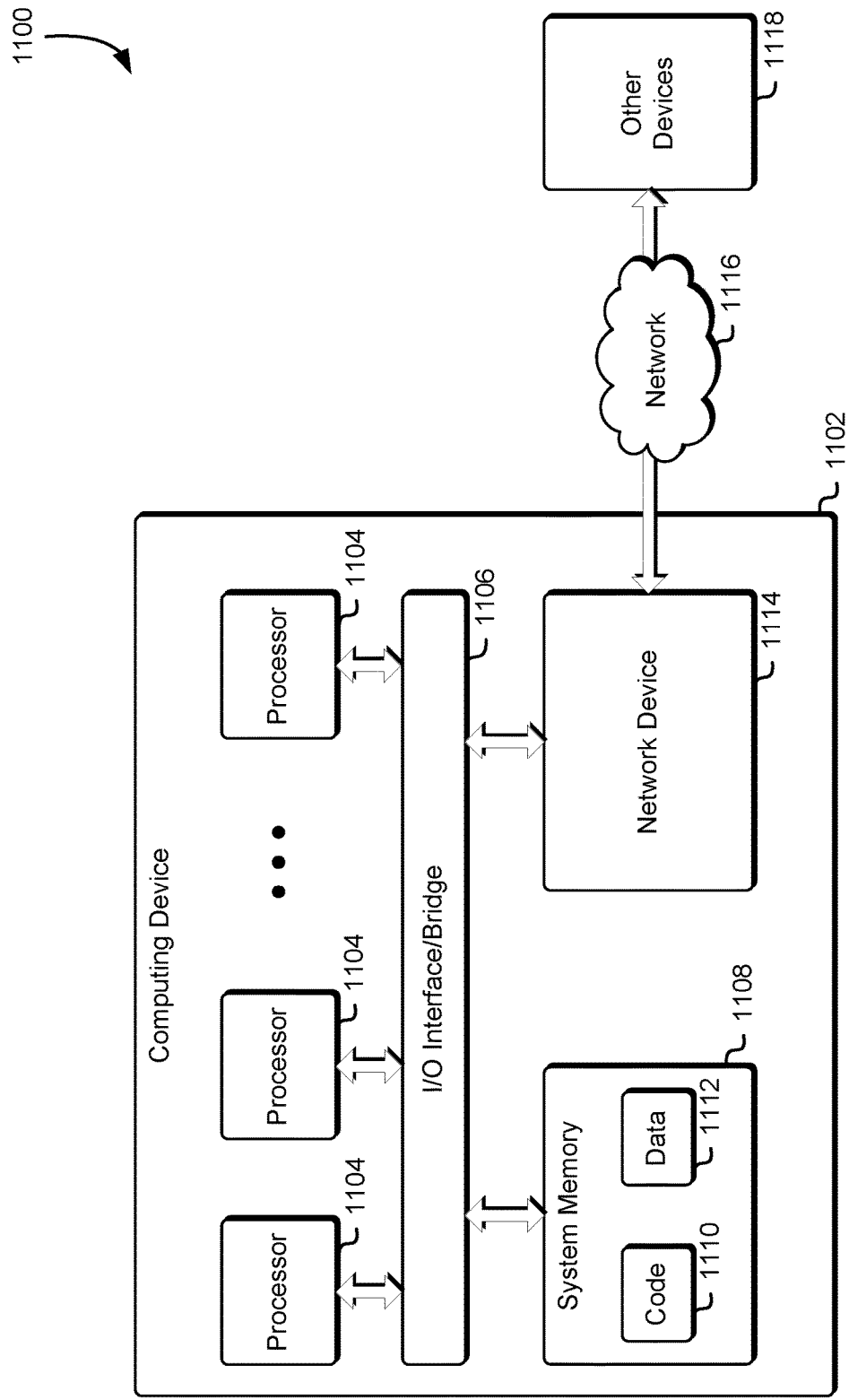
FIG. 11 illustrates an example block diagram of a computing device that can be used to implement various techniques described throughout the present disclosure.

FIG. 11 illustrates an example block diagram 1100 of a computing device that can be used to implement various techniques described throughout the present disclosure. In at least some embodiments, a server that implements a portion or all of one or more of the techniques described herein may include a general-purpose computer system that includes or is configured to access one or more computer-readable storage media. FIG. 11 illustrates such a general-purpose computing device 1102. In the illustrated embodiment, computing device 1102 includes one or more processors 1104 coupled to a system memory 1108 (which may comprise both non-volatile and volatile memory modules) via an input/output (I/O) interface 1106. The computing device 1102 further includes a network device 1114 coupled to the I/O bridge 1106.

In various embodiments, computing device 1102 may be a uniprocessor system including one processor 1104, or a multiprocessor system including several processors 1104 (e.g., two, four, eight, or another suitable number). Processors 1104 may be any suitable processors capable of executing instructions. For example, in various embodiments, processors 1104 may be general-purpose or embedded processors implementing any of a variety of instruction set architectures (ISAs), such as the x86™, PowerPC™, SPARC™, or MIPS ISAs, or any other suitable ISAs. In multiprocessor systems, each of processors 1104 may commonly, but not necessarily, implement the same ISA. In some implementations, graphics processing units (GPUs) may be used instead of, or in addition to, conventional processors.

System memory 1108 may be configured to store instructions and data accessible by processor(s) 1104. In at least some embodiments, the system memory 1108 may comprise both volatile and non-volatile portions; in other embodiments, only volatile memory may be used. In various embodiments, the volatile portion of system memory 1108 may be implemented using any suitable memory technology, such as static random access memory (SRAM), synchronous dynamic RAM, or any other type of memory. For the non-volatile portion of system memory, in some embodiments flash-based memory devices, including NAND-flash devices may be used. In some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1108 as code 1110 and data 1112.

In some embodiments, I/O interface/bridge 1106 may be configured to coordinate I/O traffic between processor 1104, system memory 1108, and any peripheral devices of the computing device such as, for example, a network device 1114, a storage device (not shown), or other peripheral interfaces. In some embodiments, one or more other devices (not shown) may also be attached to the I/O interface/bridge 1106 (e.g., using a PCIe interconnect). In some embodiments, I/O interface/bridge 1106 may perform any necessary protocol, timing, or other data transformations to convert data signals from one component (e.g., system memory 1108) into a format suitable for use by another component (e.g., processor 1104). In some embodiments, I/O interface/bridge 1106 may include support for devices attached through various types of peripheral interconnects (e.g., a PCIe interconnect) or, for example, a bus complying with the Universal Serial Bus (USB) standard. In some embodiments, the function of I/O interface/bridge 1106 may be split into two or more separate components, such as a north bridge and a south bridge, for example. Also, in some embodiments some or all of the functionality of I/O interface/bridge 1106, such as an interface to system memory 1108, may be incorporated directly into processor 1104.

Network device 1114 may be configured to allow data to be exchanged between computing device 1102 and other devices 1118 attached to a network or networks 1116. In various embodiments, network device 1114 may support communication via any suitable wired or wireless general data networks, such as those described herein.

In some embodiments, system memory 1108 may be one embodiment of a computer-readable storage medium configured to store program instructions and data as described herein for implementing embodiments of the corresponding methods and apparatus. However, in other embodiments, program instructions and/or data may be received, sent, or stored upon different types of computer-readable storage media. Generally speaking, a computer-readable storage medium may include non-transitory computer-storage storage media or memory media such as magnetic or optical media, e.g., disk or DVD/CD coupled to computing device 1102 via I/O interface/bridge 1106. A non-transitory computer-readable storage medium may also include any volatile or non-volatile media such as RAM (e.g., SDRAM, DDR SDRAM, RDRAM, SRAM, etc.), ROM, etc., that may be included in some embodiments of computing device 1102 as system memory 1108 or another type of memory. Further, a computer-readable storage medium may include transmission media or signals such as electrical, electromagnetic, or digital signals, conveyed via a communication medium such as a network and/or a wireless link, such as may be implemented via a network device 1114. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Figure 12:
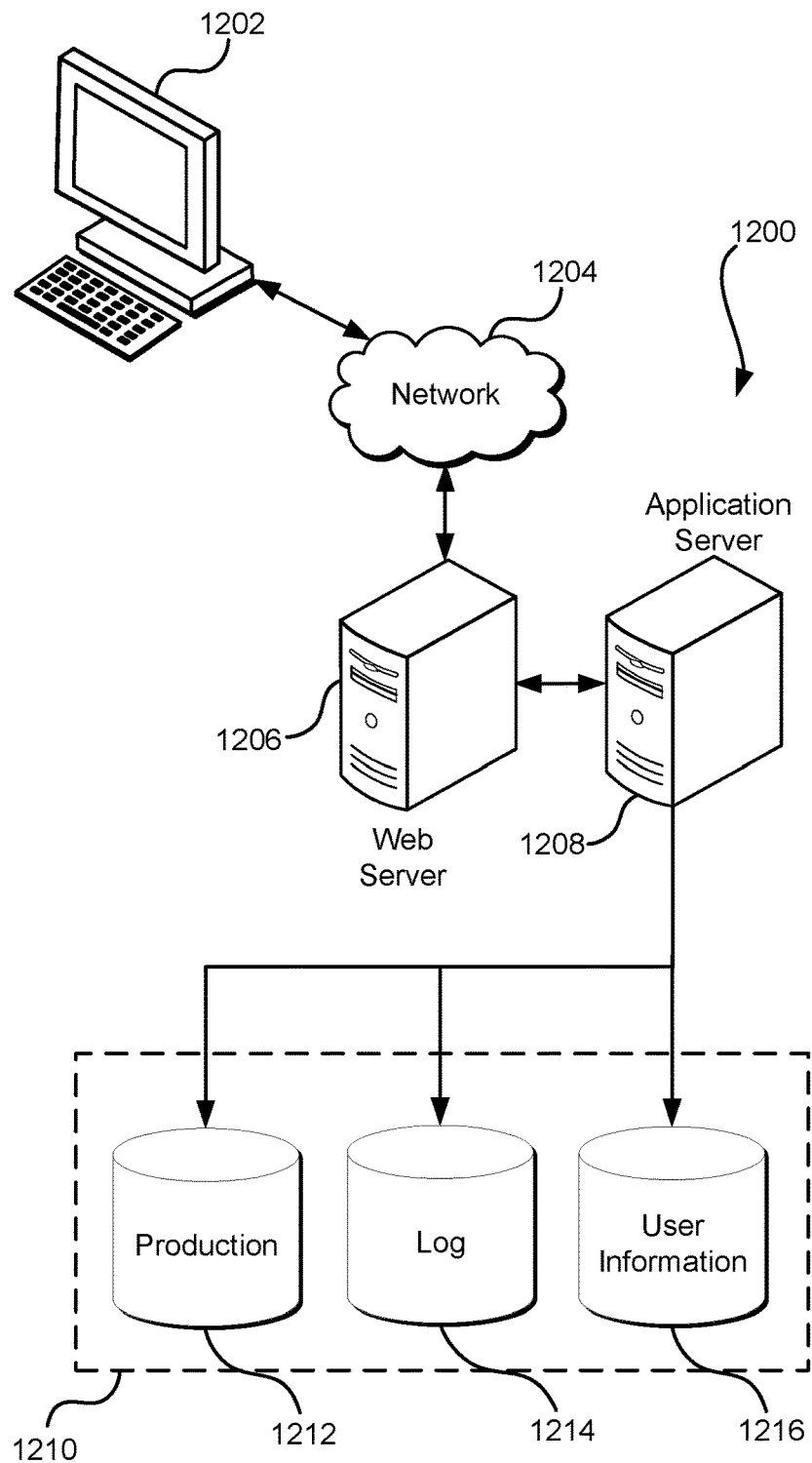
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments such as, for example, computer systems including processors and memory as well as the executable instructions included thereon.

The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the terms "data store" and "storage" refers to any device or combination of devices capable of storing, accessing, and retrieving data, which may include any combination and number of data servers, databases, data storage devices and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. Further, operations described herein as being performed by a single device may, unless otherwise clear from context, be performed collectively by multiple devices, which may form a distributed and/or virtual system. The application server 1208 may include processors, co-processors (e.g., compression co-processors), memory, and peripheral devices such as, for example, storage devices, and other such computer system elements.

The data store 1210 can include several separate data tables, databases, data documents, dynamic data storage schemes, and/or other data storage mechanisms and media for storing data relating to a particular aspect of the present disclosure. For example, the data store illustrated may include mechanisms for storing production data 1212 and user information 1216, which can be used to serve content for the production side and/or to the user side. The data store also is shown to include a mechanism for storing log data 1214, which can be used for reporting, analysis, or other such purposes. The data store 1210 is operable, through logic associated therewith, to receive instructions from the application server 1208 and obtain, update, or otherwise process data in response thereto. The application server 1208 may provide static, dynamic, or a combination of static and dynamic data in response to the received instructions.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices, processors, co-processors, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. A computer-implemented method, comprising:
receiving a request for compression of data, the request specifying one or more compression parameters;
determining a compression target block size;
compressing a portion of the data to produce a set of compressed data; and
as a result of determining that compressing another portion of the data to produce a compressed another portion and storing the compressed another portion of the data in an output data block would increase a file size of the output data block over a threshold value for the output data block:
stopping the compression;
writing the compressed portion to the output data block; and
associating the output data block with metadata that provides an indication of content of the output data block.

2. The computer-implemented method of claim 1, wherein:
the request for compression further specifies a storage location for storing the output data block; and
determining the compression target block size comprises determining the compression target block size based on a storage block size in the storage location.

3. The computer-implemented method of claim 1, wherein the portion of the data is selected based at least in part on a maximum inflation ratio of a compression algorithm, the compression algorithm specified in the compression parameters.

4. The computer-implemented method of claim 1, wherein the portion of the data is selected, based at least in part on a difference between a file size of the output data block and the compression target block size.

5. A system, comprising:
a processing unit, that:
receives a request indicating input data and including compression parameters; and
iteratively compresses a portion of the input data to an output data block, based at least in part on the compression parameters, until compressing another portion of the input data to produce a compressed another portion and storing the compressed another portion in the output data block would increase a file size of the output data block over a threshold value for the output data block.

6. The system of claim 5, wherein the processing unit is a compression co-processor.

7. The system of claim 5, wherein the request indicates the threshold value.

8. The system of claim 5, wherein the compression parameters specify a compression algorithm and one or more compression settings for the compression algorithm.

9. The system of claim 5, wherein the request indicates input data by including a scatter-gather list, the scatter-gather list indicating one or more memory locations of the data.

10. The system of claim 5, wherein:
the input data comprises a plurality of rows from a key-value store;
the portion of the input data comprises one or more rows from the plurality of rows; and
each row of the one or more rows is compressed as an atomic unit.

11. The system of claim 5, wherein the processing unit is at least one of: a central processing unit, a graphics processing unit, a field programmable gate array, a direct memory access circuit, a system-on-a-chip, or an application-specific integrated circuit.

12. The system of claim 5, wherein the processing unit is further configured to:
store the output data block into a persistent storage on a condition that compressing another portion of the input data and storing the compressed another portion in the output data block would increase a file size of the output data block over the threshold value; and associate the stored output data block with metadata that provides an indication of the portions of data compressed to the output data block.

13. A system, comprising:
a processor configured to:
  receive a request to compress input data using incremental compression, the request specifying the input data and compression parameters;
  determine a compression target block size;
  compress a portion of the input data into an output data file;
  determine that a file size of the output data file would exceed the compression target block size if an additional portion of input data were compressed into the output data file; and
  add padding to the output data file in an amount such that the file size of the output data file is equal to the compression target block size.

14. The system of claim 13, wherein the request specifies the compression target block size.

15. The system of claim 13, wherein the processor is configured to determine the compression target block size based at least in part on a block size used in a storage location of the output data file.

16. The system of claim 13, wherein the processor is configured to divide the input data into a plurality of portions of input data by determining a first portion of the input data such that the first portion of the input data has a file size that is smaller than the compression target block size.

17. The system of claim 13, wherein:
the input data comprises a plurality of atomic units; and
the processor is configured to divide the input data into portions of input data, each portion of input data comprising a respective one of the atomic units.

18. The system of claim 13, wherein the processor includes a storage location for storing a plurality of descriptors, each descriptor of the plurality of descriptors at least including a location of a corresponding block of compressed data to be retrieved from data storage and decompressed by the processor.

19. The system of claim 13, wherein the processor is configured to:
  store the output data file in a persistent storage; and
  associate the output data file in the persistent storage with a set of metadata that provides an indication of the portions of the input data compressed to the output data file.

20. The system of claim 13, wherein the processor is configured to:
  compress the portion of input data into a second output data file until a file size of the second output data file would exceed the compression target block size if an additional portion of input data were compressed into the second output data file; and
  add padding to the second output data file in an amount such that the file size of the second output data file is equal to the compression target block size.

* * * * *